United States Patent
Trudel et al.

(10) Patent No.: US 12,348,098 B2
(45) Date of Patent: Jul. 1, 2025

(54) WINDING RECONFIGURATION ASSEMBLY AND METHOD FOR OPERATION OF SAID ASSEMBLY

(71) Applicant: DANA TM4 INC., Boucherville (CA)

(72) Inventors: Carl Trudel, Boucherville (CA); Michel Tulane, Saint-Hubert (CA); Benoit Blanchard St-Jacques, Sainte-Julie (CA); Luke Miller, Montreal (CA); Martin Houle, Laval (CA)

(73) Assignee: DANA TM4 INC., Boucherville (CA)

( * ) Notice: Subject to any disclaimer, the term of this patent is extended or adjusted under 35 U.S.C. 154(b) by 439 days.

(21) Appl. No.: 17/814,437

(22) Filed: Jul. 22, 2022

(65) Prior Publication Data
US 2024/0030767 A1  Jan. 25, 2024

(51) Int. Cl.
| | |
|---|---|
| H02P 1/00 | (2006.01) |
| H02K 1/16 | (2006.01) |
| H02K 3/28 | (2006.01) |
| H02P 3/00 | (2006.01) |
| H02P 5/00 | (2016.01) |
| H02P 25/18 | (2006.01) |

(52) U.S. Cl.
CPC .............. H02K 3/28 (2013.01); H02K 1/165 (2013.01); H02P 25/184 (2013.01); *H02K 2203/09* (2013.01)

(58) Field of Classification Search
CPC ......... H02K 3/28; H02K 1/165; H02P 25/184
USPC ....................................................... 318/139
See application file for complete search history.

(56) References Cited

U.S. PATENT DOCUMENTS

| | | | |
|---|---|---|---|
| 9,812,931 B2 | 11/2017 | Lankin et al. | |
| 10,693,408 B2 | 6/2020 | Obry et al. | |
| 2004/0090196 A1* | 5/2004 | Maslov | H02P 1/48 318/272 |

(Continued)

FOREIGN PATENT DOCUMENTS

| | | |
|---|---|---|
| WO | 2005096492 A1 | 10/2005 |
| WO | 2013059914 A1 | 5/2013 |

(Continued)

OTHER PUBLICATIONS

Kume, T. et al., "A quick transition electronic winding changeover technique for extended speed ranges," Proceedings of the 2004 IEEE 35th Annual Power Electronics Specialists Conference (IEEE Cat. No.04CH37551), Jun. 20, 2004, Aachen, Germany, 6 pages.

(Continued)

*Primary Examiner* — Erick D Glass
(74) *Attorney, Agent, or Firm* — McCoy Russell LLP

(57) ABSTRACT

Methods and systems are provided for a winding reconfiguration assembly for an electric machine. The winding reconfiguration assembly includes a multi-position contactor device designed to switch stator windings in the electric machine between a first electric configuration in a first position and a second electric configuration in a second position. The winding reconfiguration assembly further includes an electromagnetic actuator configured switch the multi-position contactor device between the first position and the second position in response to a change in the polarity of a coil in the electromagnetic actuator.

16 Claims, 8 Drawing Sheets

(56) References Cited

U.S. PATENT DOCUMENTS

2016/0134210 A1* 5/2016 Bock .................... H01H 50/323
                                                        335/202

FOREIGN PATENT DOCUMENTS

WO         2013155601 A1      10/2013
WO         2016015147 A1       2/2016

OTHER PUBLICATIONS

Takatsuka, Y. et al., "A Wide Speed Range High Efficiency EV Drive System Using Winding Changeover Technique and SiC Devices," Proceedings of the 2014 International Power Electronics Conference (IPEC-Hiroshima 2014—ECCE Asia), May 18, 2014, Hiroshima, Japan, 6 pages.
Im, S. et al., "Novel Winding Changeover Method for A High Efficiency AC Motor Drive," Proceedings of the 2019 IEEE Energy Conversion Congress and Exposition (ECCE), Sep. 29, 2019, Baltimore, Maryland, 6 pages.

* cited by examiner

WINDING RECONFIGURATION ASSEMBLY AND METHOD FOR OPERATION OF SAID ASSEMBLY

TECHNICAL FIELD

The present description relates generally to methods and systems for a winding reconfiguration assembly.

BACKGROUND AND SUMMARY

Electric machines are designed with different winding configurations that constrain certain aspects of motor performance. For instance, certain prior motors have been designed with star-connected windings which have more desirable torque characteristics while delta-connected windings, which favor speed characteristics, have been used in other motors.

Attempts have been made to design motors capable of switching between multiple-winding configurations. U.S. Pat. No. 10,693,408 B2 to Obry et al. teaches a multi-phase motor that is electrically coupled to multiple inverter power circuits. The inverter power circuits allow the motor to switch between a delta configuration and a star configuration. In Obry's motor system, the power circuits are spaced away from the three-phase stator.

U.S. Pat. No. 9,812,931 B2 to Lankin et al. teaches an electric motor for a lawn mower. The electric motor is designed to switch between a wye configuration and a delta configuration. The switching mechanism includes a switching plate that is actuated via actuators which include electromagnetic coils.

The inventors have recognized several drawbacks with the motor taught by Obry as well as the motor taught by Lankin. For instance, positioning the inverters power circuits away from the multi-phase motor decreases the motor's adaptability, increases the motor system's size, and poses constraints to use in at least some vehicles, for example. Further, using multiple inverter power circuits increases the complexity of the system which may lengthen manufacturing and may increase the likelihood of component degradation. Lankin's motor demands electric power to either sustain engagement or disengagement of the switch plate, thereby decreasing the motor's operating efficiency, and increasing the likelihood of the motor unexpectedly switching configurations. Lankin's switching assembly that includes the switching plate is space inefficient. Further, Lankin's switching device is constrained to switching the motor between the delta and wye configurations, which may be undesirable in certain vehicles.

The inventors have recognized the abovementioned issues with previous motors and switching devices and developed a winding reconfiguration assembly for winding reconfiguration an electric machine to at least partially overcome these issues. The winding reconfiguration assembly includes a multi-position contactor device designed to switch stator windings in the electric machine between a first electric configuration in a first position and a second electric configuration in a second position. The winding reconfiguration assembly further includes an electromagnetic actuator configured switch the multi-position contactor device between the first position and the second position in response to a change in the polarity of a coil in the electromagnetic actuator. In this way, the electromagnetic actuator is able to efficiently switch the contactor device between multiple positions using a polarity reversal. Using the polarity reversal to toggle the contactor, allows the contactor to remain in a commanded position without a hold current, if so desired. Consequently, the winding reconfiguration assembly's operating efficiency as well as reliability, in the event of actuator power loss, is increased.

Further, in one example, the multi-position contactor device may be configured to switch to a neutral position where electric energy transfer from the winding reconfiguration assembly to the electric machine is inhibited. In this way, power to the electric machine may be turned off via operation of the winding reconfiguration assembly during selected conditions to decrease the chance of machine degradation. Consequently, the machine's reliability may be further increased.

In yet another example, the winding reconfiguration assembly may further include one or more cooling plates designed to transfer heat from the electromagnetic actuator to a housing of the electric machine. Using cooling plates in this manner allows insulating materials for the electromagnetic actuator to be used which provide a desired amount of insulation to decrease the size of the actuator but may have decreased thermal conduction properties. In this way, the size of the winding reconfiguration assembly may be reduced while achieving desired electromagnetic and thermodynamic characteristics.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A winding reconfiguration assembly for stator windings switching in an electric machine is described herein. The winding reconfiguration assembly achieves increased space and operating efficiency as well as increased reliability when compared to previous motor switching systems. To achieve these characteristics, the winding reconfiguration assembly includes a multi-position contactor device designed to switch stator windings between at least two configurations (e.g., a delta configuration and a star configuration or a series configuration and a parallel configuration). Utilizing the dynamic winding reconfiguration assembly for winding configuration selection permits the electric machine to be operated through a larger torque and speed bandwidth, afforded by the different winding configurations, when compared to motors with static winding configuration. The use of the dynamic winding selector, may further be leveraged to increase the torque and power density by reducing the machine's external diameter. The assembly further includes an electromagnetic actuator designed to move the multi-position contactor device between different positions when a polarity of a coil in the electromagnetic actuator is switched. For instance, the electromagnetic actuator may include a latch coupled to the coil. For actuator switching, transient electric pulses are supplied to the coil to efficiently toggle the actuator between multiple positions, via permanent magnet latching. In this way, the electromagnetic actuator is designed to effectively and rapidly switch the contactor device between commanded positions. The use of permanent magnet latching allows the contactor device to be maintained in a desired configuration without the use of a sustained current supply to hold the device in a commanded position, if so desired, thereby increasing actuator efficiency.

The multi-position contactor device may further be designed to operate in a neutral configuration, thereby enabling electric power delivered to the electric machine from the inverter to be discontinued, to decrease the likelihood of electric machine degradation during certain operating conditions, for example. The electric machine adaptability is consequently increased.

Figure 1:
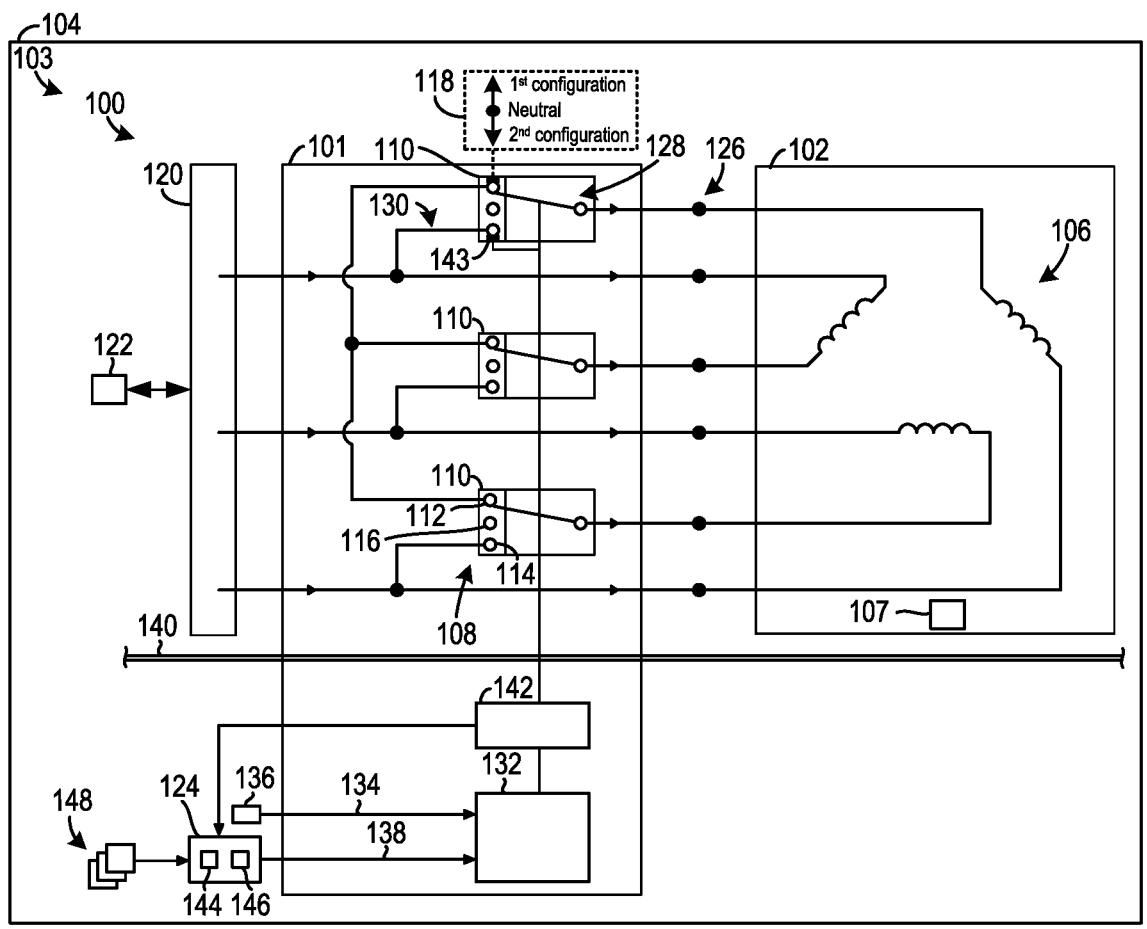
FIG. 1 shows a circuit diagram of electric machine with a winding reconfiguration assembly.

FIG. 1 shows an electric circuit diagram 100 for a winding reconfiguration assembly 101. In the diagram circles represent electrical junctions. The winding reconfiguration assembly 101 is used to switch the stator winding configuration of a multi-phase electric machine 102. The winding reconfiguration assembly 101 and the multi-phase electric machine 102 may be included in a multi-phase electric machine system 103.

As discussed in greater detail herein the winding reconfiguration assembly 101 may be incorporated into or otherwise mounted to a housing of the electric machine 102. As such, the winding reconfiguration assembly and the electric machine 102 may be positioned in a common enclosure to facilitate efficient incorporation into an electric drive unit 104 of an electric vehicle (e.g., battery electric vehicle or a hybrid electric vehicle) such as an electric axle. As such, the electric machine 102 may be a traction motor (e.g., traction motor-generator), in one example. However, the winding reconfiguration assembly 101 and associated multi-phase electric machine 102 may be used in other systems such in industrial systems, machine tools, appliances, and the like.

The winding reconfiguration assembly 101 is designed to switch stator windings 106 in the electric machine between a first electric configuration and a second electric configuration. In one example, the first electric configuration may be a star configuration and the second configuration may be a delta configuration or vice versa. In other examples, the first electric configuration may be a series configuration and the second electric configuration may be a parallel configuration or vice versa. This winding configuration adaptability increases electric machine efficiency through a wider machine speed range in comparison to motors with a static winding configuration. The winding reconfiguration functionality further enables an increase in the machine's speed/torque range as well as machine efficiency over the expanded range.

The multi-phase electric machine 102 is illustrated as a machine with three-phase stator windings 106. However, electric machines with six and nine phase stator windings, have been contemplated. Further, the stator windings 106 of the electric machine electromagnetically interact with a rotor 107, which is schematically depicted in FIG. 1. In turn, the rotor 107 may include a rotor shaft coupled to a drivetrain component such as an input shaft for a gearbox or a transmission, when the electric machine is deployed in a vehicle. However, it will be understood that the electric machine and corresponding winding reconfiguration assembly may be used in other systems.

The winding reconfiguration assembly 101 includes a multi-position contactor device 108 that switches the winding configuration. As illustrated, the multi-position contactor device 108 includes three multi-position contactors 110 incorporated therein, allowing dynamic reconfiguration of all the phases of the stator winding simultaneously. However, the contactor device may include an alternate number of contactors. For instance, in a six-phase electric machine the contactor device may include six contactors. The number of contactors may therefore correlate to the number of phases in the electric machine. The multi-position contactor device is designed to dynamically reconfigure the stator winding configuration faster than previous switching devices, thereby enhancing electric machine performance.

Each of the contactors 110 in the multi-position contactor device 108, in the illustrated example, has a first position 112 corresponding to the first electric configuration (e.g., the star configuration or the series configuration) and a second position 114 corresponding to the second electric configuration (e.g., the delta configuration or the parallel configuration) as well as a neutral configuration 116. To elaborate, in one example, the contactors may be designed to switch between a star configuration and a delta configuration. In another example, the contactors may be designed to switch between a parallel configuration and a series configuration, referred to as an H-bridge set.

The contactors adjustability between these positions is indicated at 118. In the neutral position, the contactor device prevents electric power transfer from the winding reconfiguration assembly 101 to the stator windings 106. In this way, electric power to the electric machine may be discontinued via winding reconfiguration assembly, to avoid conditions that may lead to machine degradation. Consequently, electric machine longevity is increased. However, in other examples, the contactors neutral position may be forgone. As such, the multi-position contactors may be two or three position contactors. The contactors may be placed in the neutral configuration to avoid undesirable motor braking.

An inlet phase electrical interface 120, such as multiple bus bars, provides an electrical connection between the winding reconfiguration assembly 101 and an inverter 122. A controller 124 (e.g., a machine control unit (MCU)) may augment the electrical power delivered from the inverter 122 to the inlet phase electrical interface 120.

A flexible return phase electric interface 126, such as multiple bus bars, serves as a return phase connection between the stator windings 106 and the winding reconfiguration assembly 101. The flexibility of this electric interface allows the contactor device to switch between different positions. The flexible sections of the return phase bus bars are specifically indicated at 128. The flexibility of the return phase bus bars allows the multi-position contactors 110 to be switched between their different operating positions. Further, as illustrated, return phase short bus bars 130 are electrically coupled to the second positon of the multi-position contactors 110. In this way, the contactors allow electric energy to flow back to the inlet phase bus bars in their second position to facilitate efficient switching of the winding reconfiguration assembly 101.

The winding reconfiguration assembly 101 further includes an electromagnetic actuator 132 configured to switch the multi-position contactor device between the first position, the second position, and the neutral position. This switching occurs in response to a change in polarity of a coil in the actuator. The electromagnetic actuator 132 is schematically illustrated in FIG. 1 but it will be understood that it has greater structural complexity that is expanded upon herein with regard to FIGS. 2-5B and 8-10B.

To change the coil polarity, a transient current is supplied to electromagnetic actuator 132. Arrow 134 depicts an electrical supply connection (e.g., 12 volts (V) supply) from an energy storage device 136 with the electromagnetic actuator 132. Arrow 138 depicts a control signal from a controller 124 (e.g., motor control unit (MCU)). The electromagnetic actuator 132 may be rapidly switched via a polarity change supplied to the electromagnetic actuator. However, the electromagnetic actuator remains in a target position without a hold current, if so desired. In other words, the actuator may be switched via a transient current pulse. Consequently, the electromagnetic actuator may be more efficiently and reliably operated when compared to actuators that demand a hold current to be maintained in a selected position. Thus, the electromagnetic actuator may function as a latch which does not demand hold current. Further, the electromagnetic actuator is designed to latch onto a commanded winding configuration and is sized according to the application specific demands. For instance, the electromagnetic actuator may be designed to apply enough force on the contacts to avoid contact disconnection caused by road vibrations. The specific design of the electromagnetic actuator is expanded upon herein with regard to FIGS. 2-5B and 8-10B.

A galvanic isolator 140 may further be positioned between the lower voltage electromagnetic actuator 132 and higher voltage the multi-position contactor device 108 to prevent electrical interference therebetween, thereby increasing the reliability of the winding reconfiguration assembly.

Figure 8:
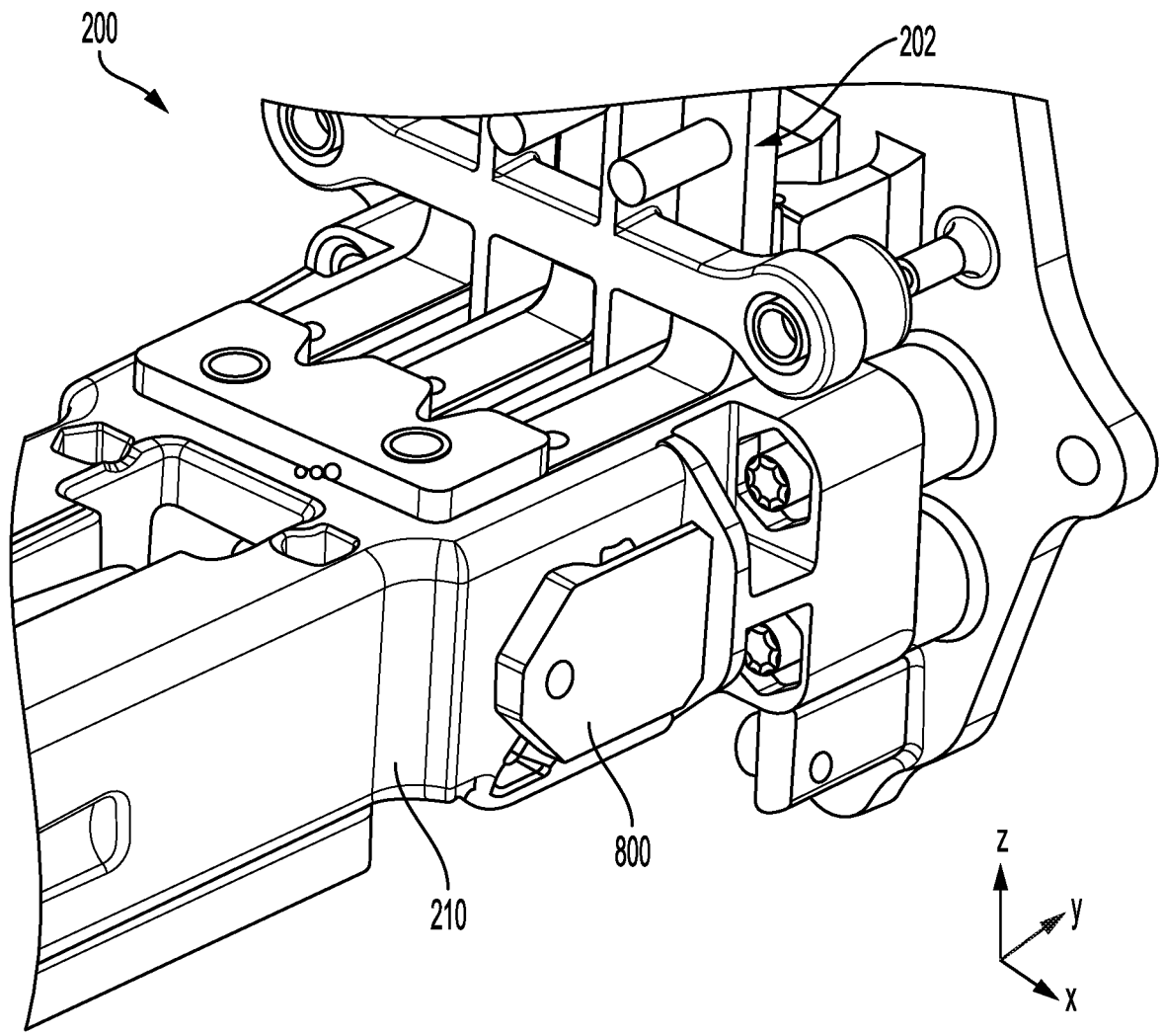
FIGS. 8-9 show detailed views of an auxiliary contactor in the winding reconfiguration assembly.
Figure 9:
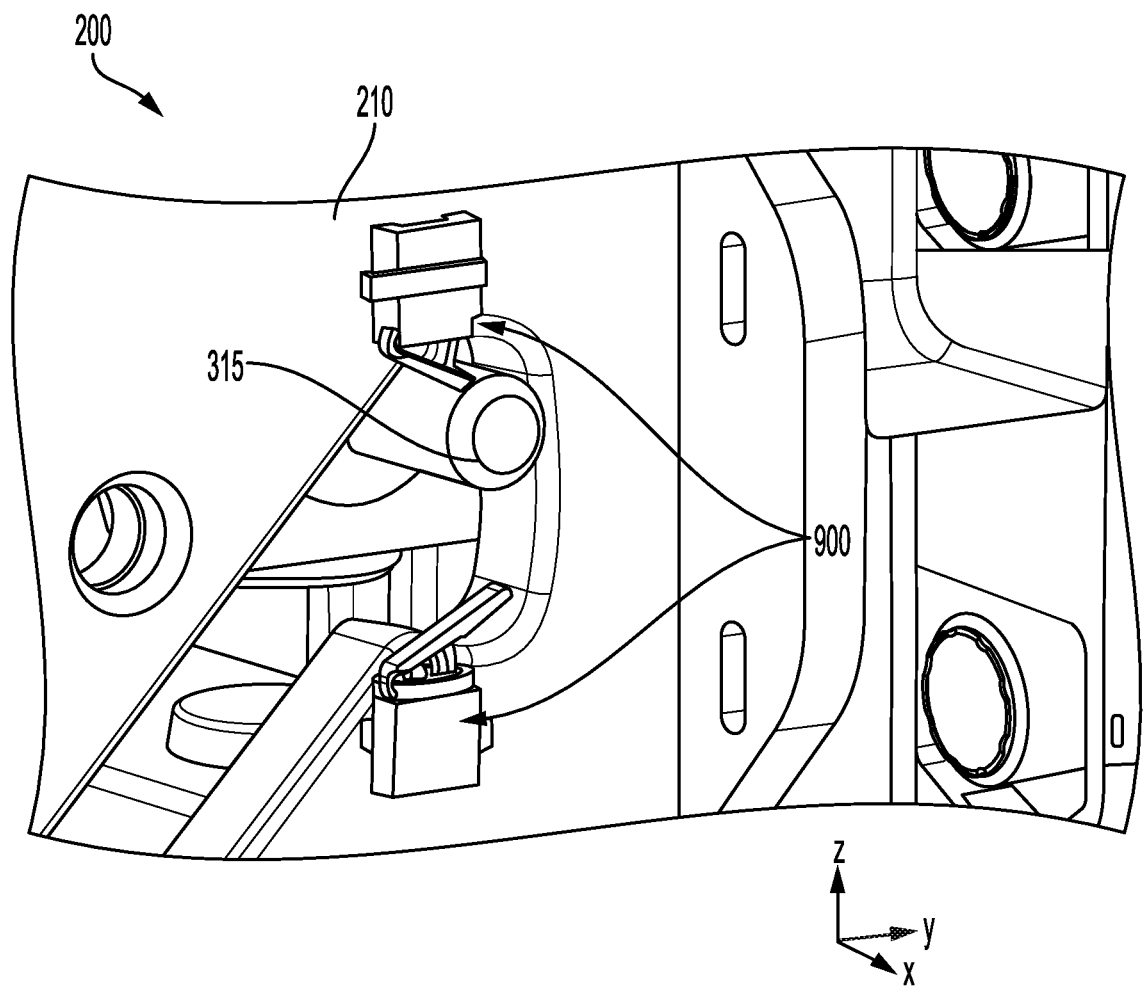

The winding reconfiguration assembly 101 is further illustrated with a sensor 142 coupled to an auxiliary contactor 143. An example of the auxiliary contactor is shown in FIGS. 8-9 and discussed in greater detail herein.

In other examples, the sensor may be omitted from the assembly. The sensor 142 sends signals to the controller 124 which are indicative of the positions of the contactors 110 in the multi-position contactor device 108. In this way, the controller may rapidly and effectively ascertain the position of the winding reconfiguration assembly 101.

The controller 124 includes a processor 144 and memory 146. The memory 146 holds instructions stored therein that when executed by the processor cause the controller 124 to perform the various methods, control techniques, and the like, described herein. The processor 144 may include a microprocessor unit and/or other types of circuits. The memory 146 includes known data storage mediums such as random access memory, read only memory, keep alive memory, combinations thereof, and the like. Sensors 148 are in electronic communication with the controller 124 and provide signals thereto. These sensors may include an electric machine speed sensor, an electric machine temperature sensor, the auxiliary contact sensor, an accelerator pedal position sensor, a battery state of charge sensor, an inverter current sensor, and the like.

Figure 2:
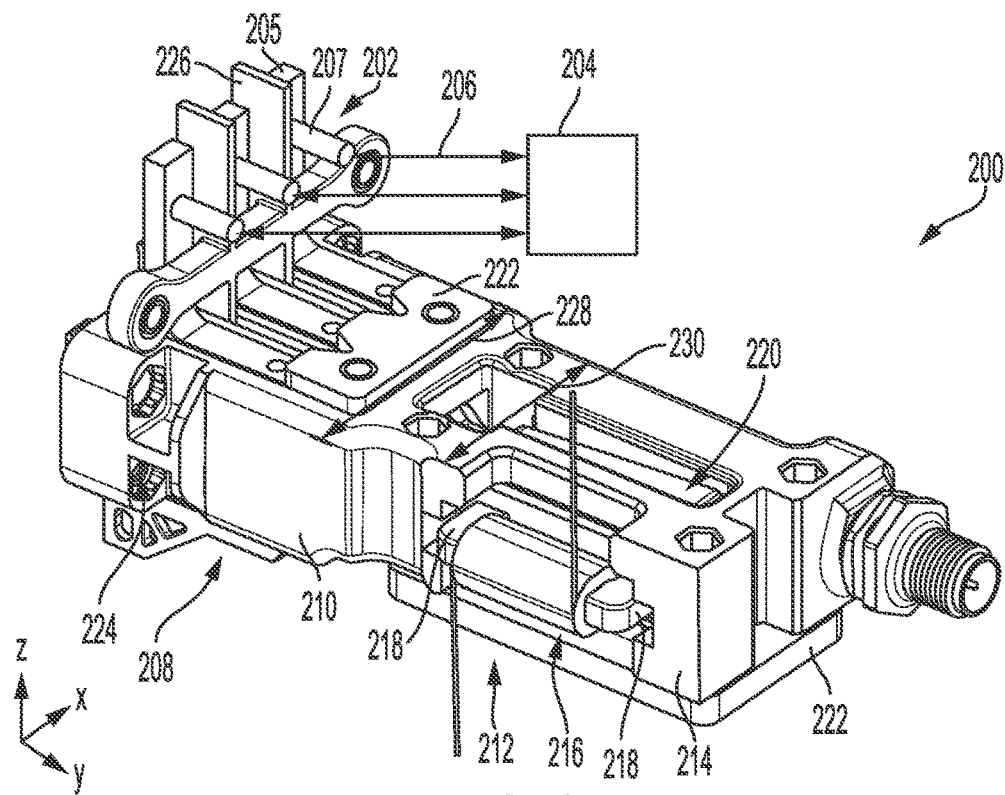
FIG. 2 shows a perspective view of an example of a winding reconfiguration assembly for an electric machine.

FIG. 2 shows an illustration of a winding reconfiguration assembly 200 for winding reconfiguration of an electric machine. The winding reconfiguration assembly 200 shown in FIG. 2 serves as an example of the winding reconfiguration assembly 101 illustrated in FIG. 1 and these assemblies may therefore have at least some overlapping structural and/or functional features.

The winding reconfiguration assembly 200 includes inlet phase bus bars 202 which is electrically connected to an inverter 204 as denoted via arrows 206. As illustrated, the inlet phase bus bars 202 include vertically extending portions 205 and longitudinal extensions 207 that serve to electrically couple to the inverter via wires or other suitable electrical connections. However, the inlet phase bus bars may have another suitable profile, in other examples.

The winding reconfiguration assembly 200 again includes multi-position contactor device 208 that is designed to switch the assembly between a first electric configuration (e.g., a delta or a series configuration), a second electric configuration (e.g., a star or a parallel configuration), and, in some examples, a neutral configuration. However, in other examples, the contactor device 208 may be designed to switch between the first configuration and the second configuration. When the winding reconfiguration assembly is designed to switch the contactor device between the series and the parallel configuration, these configurations may be referred to as an H-bridge set. The contactor device 208 is at least partially enclosed within a housing 210. To continue with the neutral embodiment of the multi-position contactor device, to place the device in a neutral position, the device may be designed to apply an equivalent field polarity on both side of the conductive extension 218 (e.g., extension driver) to allow a link 308 shown in FIGS. 3A and 3B to remain in a neutral position. This operation may be simulated by generating a very fast alternation of fields which would not allow the pivot to take position. In this context the pivot would remain in the neutral position. In another example, a mechanical system such as a spring system that functions to partially mechanically block the contactor device and allow it to stably remain in the neutral position. In this example, a pulse of positive and negative power at very high frequency may be send to the device so that the contactor remains in the neutral position retained by a spring or a partial mechanical blocking, which will allow the power supply provided to the coil to be cut. In the spring or partial mechanical lock design, a single calibrated pulse of current through the coil may be generated to move the pivot to the neutral point held by the spring or partial mechanical lock. In yet another example, independent magnetic circuits for the two positions may be provided in the device. This will allow fields of the same polarity to be provided so that the pivot stays in the neutral position. A spring-loaded clamp or a partial mechanical lock may still be used so that the switch does not have to remain powered to remain in the neutral position. Still further in another example, the switch may be designed such that it does not uses magnets and instead uses a solenoid activator.

The winding reconfiguration assembly 200 further includes an electromagnetic actuator 212 designed to move the contactor device between the different positions (e.g., two or three positions). The electromagnetic actuator 212 is at least partially enclosed in a holder 214 which may have structural continuity with the housing 210. However, assembly configurations which include separately constructed and connected housing and holder features have been envisioned. The electromagnetic actuator 212 includes a coil 216. The coil 216 is designed to receive electrical input from a power source (e.g., 12V power source) and wraps around conductive extensions 218 that may be formed in a U-shape. Specifically, the electrical input may switch coil polarity to toggle the contactor device 208. The electromagnetic actuator 212 includes a magnetic device 220 that rotates about a pivot 500, depicted in FIGS. 5A and 5B, discussed in greater detail herein. The magnetic device 220 include permanent magnets embedded therein that interact with conductive extensions of the coil 216 to induce rotation of the device. The magnetic device 200 may be a block that floats in a slot formed in holder 214.

The interaction between the coil and the magnetic components in the device is expanded upon below with regard to FIGS. 10A and 10B which show a higher level representation of the electromagnetic actuator 212 that includes the coil 216 with electrical connections 316, the conductive extensions 218, and the magnetic device 220. The magnetic device 220 includes sections 1000 with a first polarity and sections 1002 with a second polarity opposite to the first polarity.

When the coil 216 is not powered, the conductive extension 218 (e.g., the magnetic core) has no polarity and therefore behaves like a steel part. Since the central part that rotates around the pivot 500 has permanent magnets, it will have a fixed polarity in sections 1000 and 1002. In the illustrated example, the sections 1000 may have a south polarity and the sections 1002 may have a north polarity. However, in other examples, the polarity may be switched. The polarity in the conductive extension may be switched to create rotation of the magnetic device 220 about the pivot 500.

When the coil 216 is not powered, a magnetic core of the conductive extension 218 may have no polarity and therefore behaves like a steel component. Since the central portion that rotates about the pivot 500, shown in FIG. 5 has permanent magnets 508 it will have a fixed polarity.

Figure 10A:
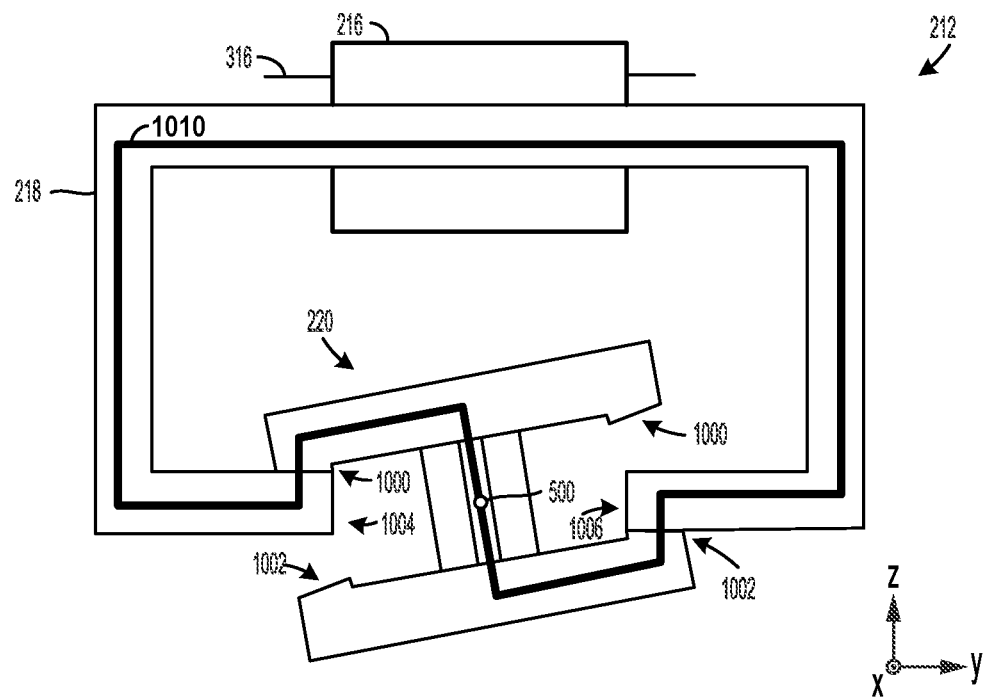
FIGS. 10A-10B show the electromagnetic actuator in the first and second configurations.

Specifically FIG. 10A shows the electromagnetic actuator 212 in the first configuration. In the first configuration, the coil 216 is fed a positive current on the right side and a negative current on the left side. As such in the first configuration, the section 1004 of the conductive extension 218 is attracted to one of the sections 1000 and the section 1006 is attracted to one of the sections 1002, thereby rotating the magnetic device 220 in a counterclockwise direction.

Figure 10B:
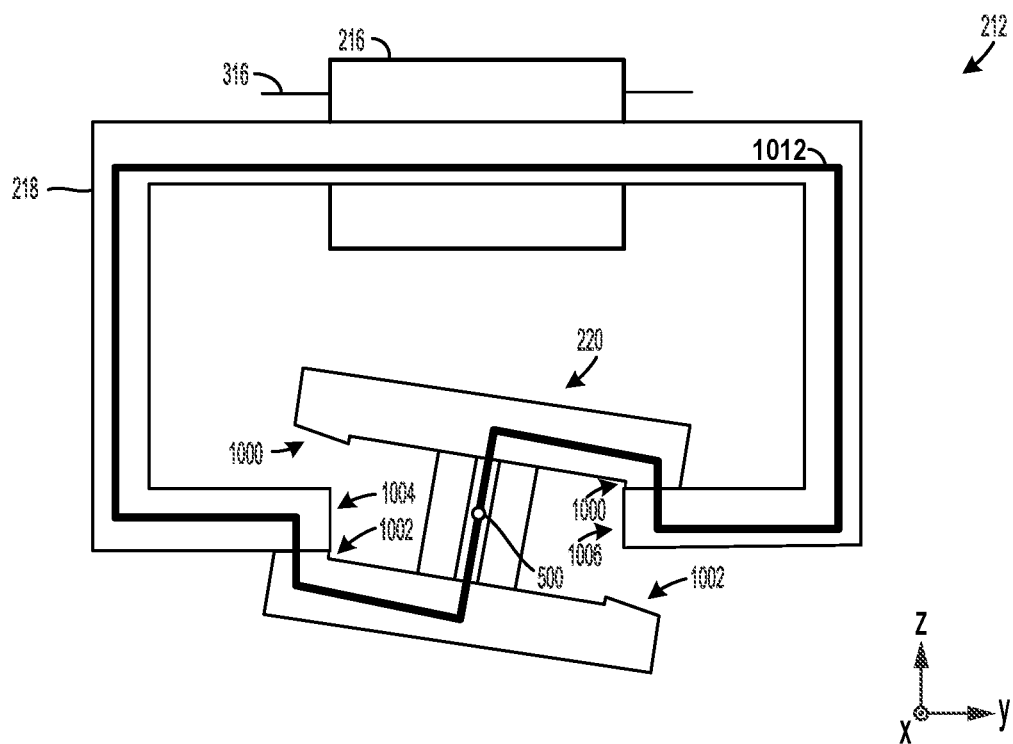

FIG. 10B shows the electromagnetic actuator 212 in the second configuration. In the second configuration, the coil 216 is fed a positive current on the left side and a negative current on the right side. Therefore, in the second configuration, the section 1004 of the conductive extension 218 is attracted to one of the sections 1002 and the section 1006 is attracted to one of the sections 1000, thereby rotating the magnetic device 220 in a clockwise direction.

It will be appreciated that after powering the coil with one polarity or another, the magnetic device 220 will maintain its position even if the power supply to the coil 216 is discontinued. Since the magnetic device 220 has permanent magnets, it will stay attracted to the conductive extension 218 that may be made of steel. It will be understood that the coil may be power to maintain a stronger contact between the conductive extension 218 and the magnetic device 220. To change the configuration, the polarity of the coil 216 is reversed. For a magnetic circuit to work and create a force that will drive motion, the magnetic field is formed in a closed loop. General sketches of the magnetic fields in the electromagnetic actuator 212 are indicated at 1010 and 1012 in FIGS. 10A and 10B, respectively.

The winding reconfiguration assembly 200 further includes cooling plates 222 designed to transfer heat from the electromagnetic actuator 212 to the holder 214 and from the inlet phase bus bars 202 to the housing 210. In turn, heat may be conducted from the housing 210 to the housing of the electric machine (e.g., the electric machine 304, shown in FIGS. 3A and 3B). The housing 210 includes openings 224 that allow the housing to be mounted (e.g., directly mounted) onto the electric machine, if wanted.

Non-conductive separator plates 226 may be positioned between the inlet phase bus bars 202 to insulate the bus bars, thereby negating unwanted electromagnetic interaction between the bus bar phases.

Further, the width 228 of the electromagnetic actuator 212 may be equal to or less than the width 230 of the multi-position contactor device 208 to allow the assembly to achieve a space efficient package. Consequently, the electric machine system formed with the winding reconfiguration assembly, may be more efficiently incorporated into a wider variety of vehicle platforms.

An axis system is provided in FIG. 1 as well as FIGS. 2-5B and 8-10B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 3A:
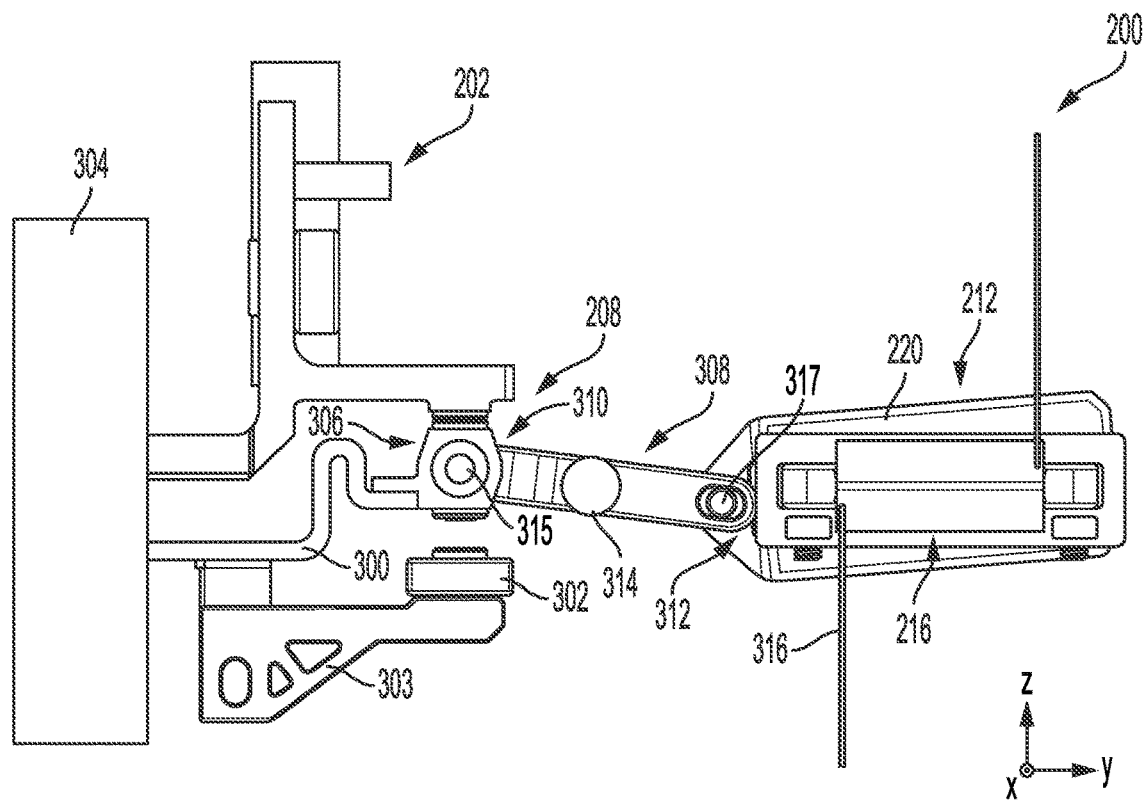
FIGS. 3A and 3B show a side view of the winding reconfiguration assembly, depicted in FIG. 2, in a first configuration and a second configuration, respectively.
Figure 3B:
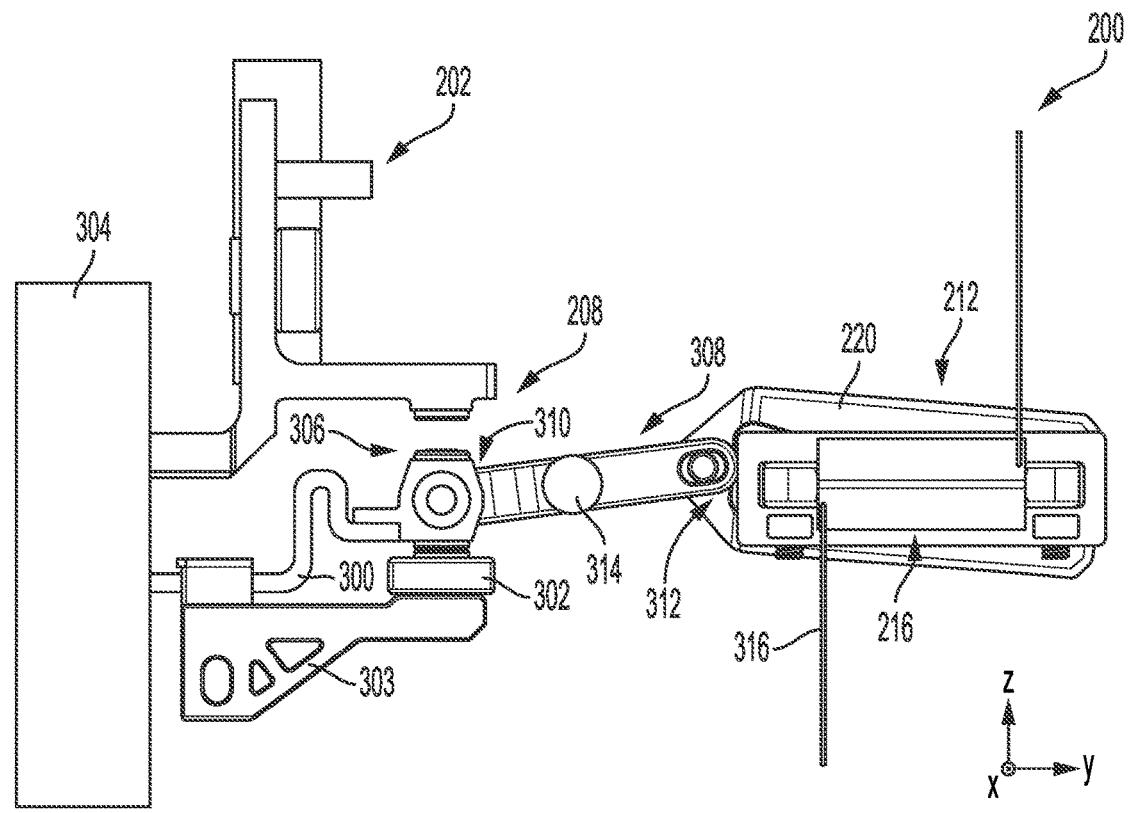

FIGS. 3A and 3B depict a cross-sectional view of the winding reconfiguration assembly 200 in its first configuration (e.g., delta configuration) and second configuration (e.g., star configuration), respectively. However, as previously discussed, the winding reconfiguration assembly may be designed to switch between other suitable configurations such as a series configuration and a parallel configuration. The inlet phase bus bars 202, flexible return phase bus bars 300, and short return phase bus bars 302 are further depicted in FIGS. 3A and 3B. In the frame of reference depicted in FIGS. 3A and 3B one of each of the aforementioned bus bars are shown, however the winding reconfiguration assembly 200 includes additional bus bars. Both the inlet phase and return phase bus bars are electrically connected to an electric machine 304. The inlet phase bus bars are further electrically connected to the inverter 204, shown in FIG. 2, as previously indicated. Further, a support structure 303 may be coupled to the short return phase bus bars 302 to support and maintain these bus bars in a desired position.

The flexible return phase bus bars 300 have contactors 306 in the multi-position contactor device 208 coupled thereto. To elaborate, in the frame of reference depicted in FIGS. 3A and 3B, one of the contactors 306 in the multi-position contactor device 208 is depicted. However, when the electric machine 304 has a three-phase configuration, the contactor device may include two other contactors corresponding to the other phases of the stator windings. More generally, the number of contactors may correspond to the number of phases of the electric machine. As such, a six-phase electric machine may have six contactors and so on.

The flexibility of the return phase bus bars allows the contactor device 208 to switch between the different configurations (e.g., the star configuration and the delta configuration or the series configuration and the parallel configuration). To achieve bus bar flexibility, the return phase bus bars 300 may be profiled to achieve a desired amount of compliance.

The contactor 306, in its first position, corresponding to the first configuration (e.g., the delta or parallel configuration), electrically connects one of the inlet phase bus bars 202 with one of the flexible return phase bus bars 300, as shown in FIG. 3A. The other contactors obscured from view function in a similar fashion.

Conversely, the contactor 306, in its second position, corresponding to the second configuration (e.g., the star or series configuration), electrically connects one of the inlet phase bus bars 202 with one of the short return phase bus bars 302, as shown in FIG. 3B. The other contactors obscured from view function in a similar fashion. As such, to switch the winding configuration, the contactor 306 moves up and down in the frame of reference of FIGS. 3A and 3B, due to the flexibility of the return phase bus bars 300.

The electromagnetic actuator 212 may be operated to induce the contactor movement. In the illustrated example, a link 308 (e.g., insulated link) is used to mechanically connect the electromagnetic actuator 212 to the contactor device 208. The use of an insulated link, allows the chance of undesirable electromagnetic interaction between the electromagnetic actuator 212 and the contactor device 208 to be reduced. The link 308 rotates above the pivot 314 near the middle and includes pivots 315 and 317 near opposing ends of the link. Further, the pivot 217 is coupled to the magnetic device 220 in the illustrated example.

The link 308 at one end 310 is coupled (e.g., pivotably coupled) to the contactor 306 and at the other end 312 is coupled (e.g., pivotably coupled) to the magnetic device 220 that pivots up and down responsive to electric impulses applied to the coil 216. In response to the magnetic device 220 in the electromagnetic actuator 212 rotating clockwise and counterclockwise, the link correspondingly rotates counterclockwise and clockwise to move the contactor 306 between positions. In one alternate example, the link may be omitted from the winding reconfiguration assembly, and the electromagnetic actuator may be directly coupled to the contactor device. Further, in another example, more complex mechanical linkage, including multiple links, may be used to connect the electromagnetic actuator and the contactor device.

It will be appreciated that the contactor device 208 may include additional contactors, corresponding to different winding phases that are toggled in a similar manner with regard to the electromagnetic actuator 212 and the link 308. For instance, the end 310 of the link 308 may be coupled (e.g., pivotably coupled) to the other contactors. In this way, the winding reconfiguration assembly may be quickly switched between configurations, enabling gains in electric machine performance.

Operation of the electromagnetic actuator 212 for contactor device switching as described above allows the winding configuration of the electric machine 304 to be more rapidly switched when compared to other winding reconfiguration devices. Due to the reduction in switching latency, performance of the electric machine may be further enhanced which further increases customer appeal. The coil 216 in the electromagnetic actuator 212 is further depicted in FIGS. 3A and 3B. Electrical connections 316 of the coil 216 are further illustrated in FIGS. 3A and 3B. The electrical connections may be connected to an energy source (e.g., the energy storage device 136, depicted in FIG. 1). Operation of the electromagnetic actuator 212 is expanded upon herein with regard to FIGS. 4-5B.

FIG. 8 shows a detailed illustration of a portion of the winding reconfiguration assembly 200 with a protective plate 800 for an auxiliary contactor 800, shown in FIG. 9. The protective plate 800 is coupled to the housing 210 and reduces the chance of auxiliary contactor degradation.

FIG. 9 depicts the pivot 315 that is included in the link 308, shown in FIGS. 3A and 3B. An auxiliary contactor 900 is coupled to the housing 219 and is designed to detects the position of the pivot 315, and the link correspondingly that moves the multiple contactors 306, shown in FIGS. 3A and 3B.

Figure 4:
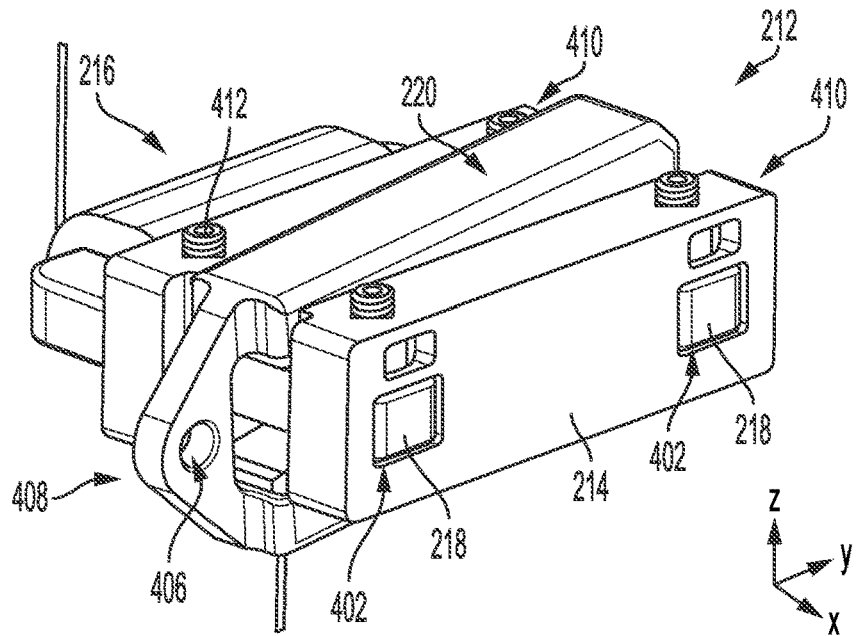
FIG. 4 shows a perspective view of an electromagnetic actuator in the winding reconfiguration assembly, depicted in FIG. 2.

FIG. 4 shows a detailed view of the electromagnetic actuator 212 with the magnetic device 220, holder 214, and coil 216 again depicted. In the illustrated example, the coil 216 includes conductive extensions 218 that extend through the holder 214 and the magnetic device 220. To expound, the conductive extensions 218 project (e.g., laterally project) through openings 402 in the holder 214, thereby constraining the position of the conductive extensions 218 which are coupled to the coil 216. The magnetic device 220 further includes upper and lower walls 502 and 504, shown in FIGS. 5A and 5B, that delimit rotation of the magnetic device 220 and allows it to securely remain in both positions.

The magnetic device 220 includes an opening 406 at one side 408 that is sized to rotationally connect to the link 308, shown in FIGS. 3A and 3B. Further, in the illustrated example, the magnetic device 220 is positioned laterally between two sections 410 of the holder 214 to enable the magnetic device to rotate along a desired arc. Still further, attachment devices 412 (e.g., screws, pins, clamps, combinations thereof, and the like) in the holder 214 may be used to attach the cooling plate 222, shown in FIG. 2, to the holder. However, other attachment techniques for the cooling plate have been contemplated such as welding.

Figure 5A:
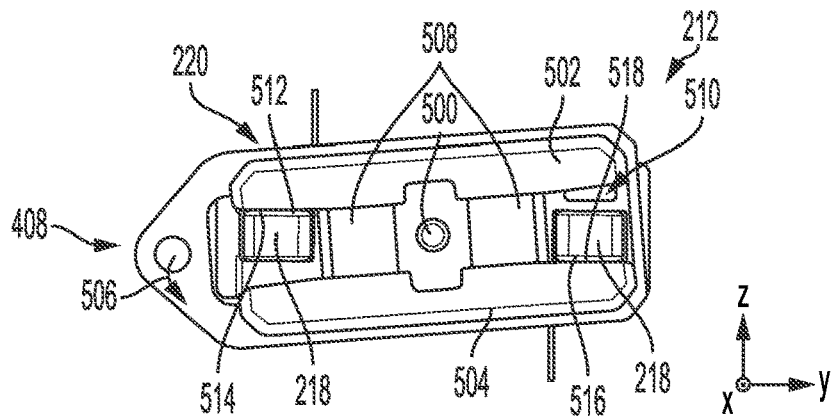
FIGS. 5A and 5B show the electromagnetic actuator in different positions.
Figure 5B:
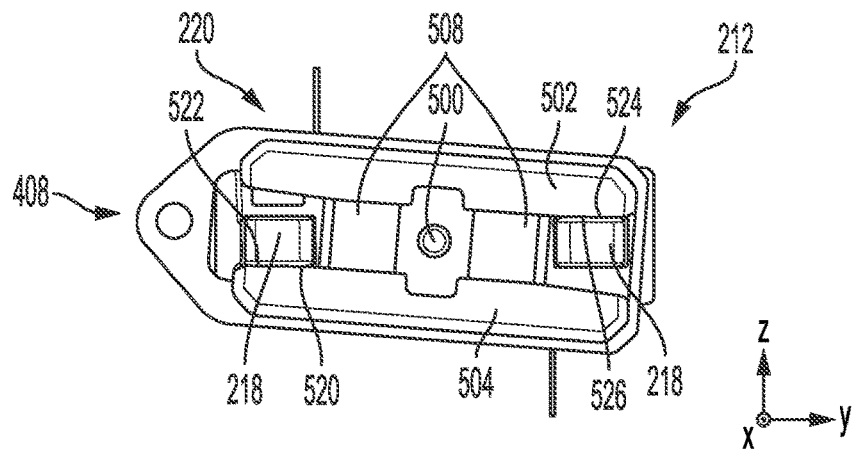

FIGS. 5A and 5B show the electromagnetic actuator 212 in a first and second configuration that induces movement of the multi-position contactor device 208 between its first and second position, shown in FIGS. 3A and 3B, respectively. In the first configuration, shown in FIGS. 5A, the magnetic device 220 has been rotated counterclockwise 506 such that the side 408 of the device that is coupled to the link 308, shown in FIGS. 3A and 3B, is in a low position.

To enable this rotation, the magnetic device 220 includes permanent magnets 508 and the upper wall 502 and the lower wall 504 which delimits rotational movement of the magnetic device due to their interaction with the conductive extensions 218 of the coil. The pivot 500 about which the magnetic device 220 rotates is further illustrated. The magnetic device 220 includes openings 510 through which the conductive extensions 218 project. These openings 510 are sized to allow the device to pivot through a desired arc.

In the first configuration illustrated in FIG. 5A, an upper surface 512 of one of the conductive extensions 218 is in face sharing contact with a surface 514 of the upper wall 502 and a lower surface 516 of the other conductive extension 218 is in face sharing contact with a surface 518 of the lower wall 504. In this way, rotation of the magnetic device is delimited. However, other component arrangement in the electromagnetic actuator may be used in other examples.

Conversely, in FIG. 5B, the side 408 of the magnetic device 220 is in a higher position. In this position, a lower surface 520 of one of the conductive extensions 218 is in face sharing contact with a surface 522 of the lower wall 504 and an upper surface 524 of the other conductive extension 218 is in face sharing contact with a surface 526 of the upper wall 502. The upper wall 502 and the lower wall 504 may be incorporated into the magnetic device 220. The multi-position contactor device 208 is illustrated along with the electromagnetic actuator 212. In the illustrated example, the multi-position contactor device 208 is a dual-positon device. However, as previously discussed the contactor device may be designed to operate in a neutral position in which electric power transfer between the inverter and the electric machine by way of the winding configuration assembly is suspended.

Figure 6:
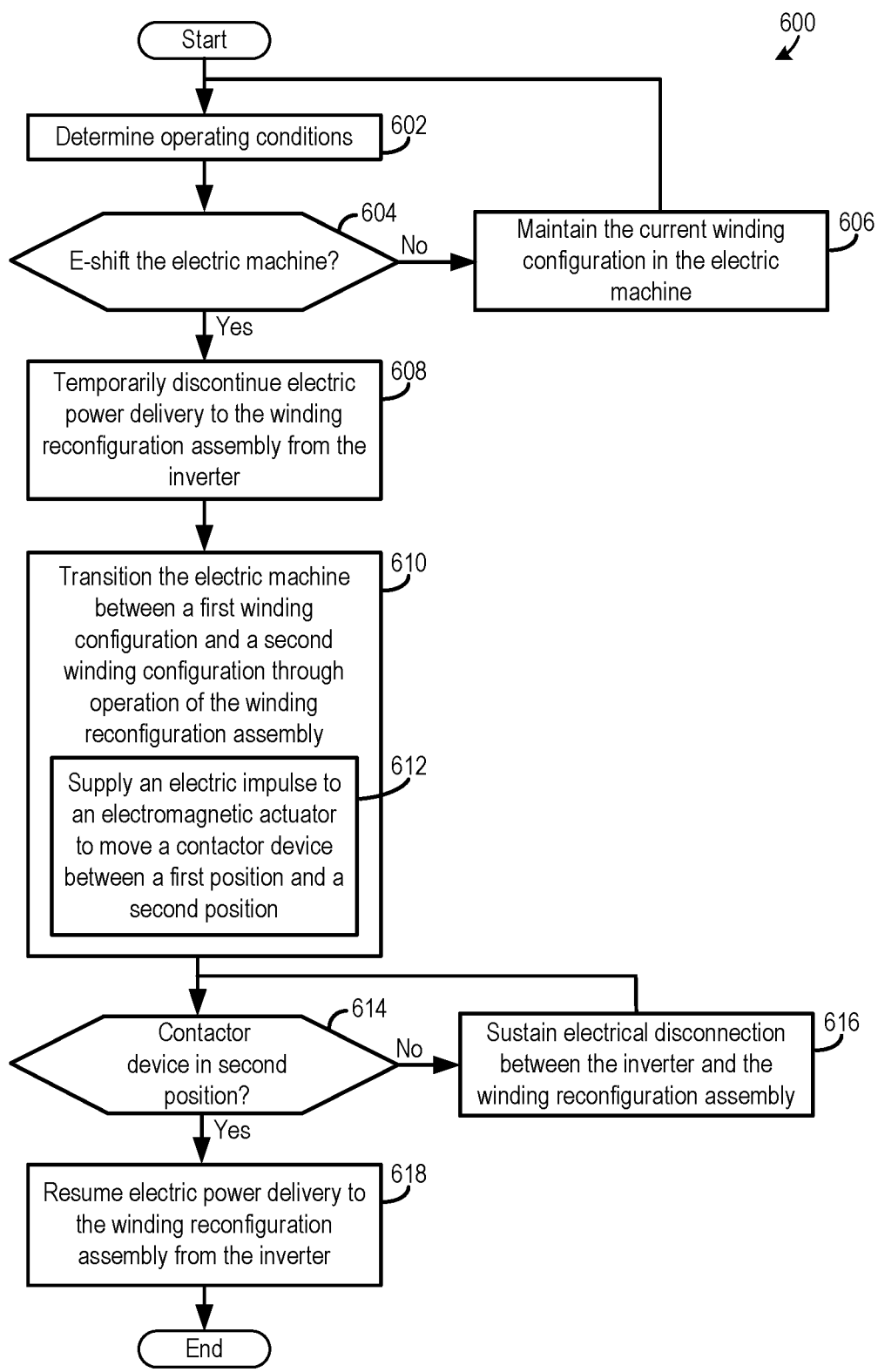
FIG. 6 shows a method for operation of a winding reconfiguration assembly in an electric machine.

FIG. 6 shows an example method 600 for operation of a winding reconfiguration assembly. Method 600 will be described in reference to the systems described herein and with regard to FIGS. 1-5B and 8-10B, but it should be understood that similar methods may be applied to other systems without departing from the scope of this disclosure. Instructions for carrying out method 600 as well as the other method described herein may be executed by a controller (e.g., the controller 124, shown in FIG. 1) in conjunction with signals received from sensors of the electric machine system, such as the sensors described above with reference to FIG. 1. The controller may employ actuators of the system to adjust operation of the system components, according to the methods described below.

At 602, the method includes determining operating conditions in the electric machine, winding reconfiguration assembly, and system in which the electric machine is deployed, such as a vehicle. The operating conditions may be ascertained from sensors and/or modeling and may include electric machine speed, electric machine load, electric machine temperature, inverter current flow, stator winding configuration, winding reconfiguration assembly position, vehicle speed, and the like.

Next at 604, the method includes judging if an E-shift for the electric machine where the stator winding configuration is adjusted via the winding reconfiguration assembly should be performed. This judgement may be performed based on the operating conditions ascertained at step 602. For instance, if the machine speed or load surpasses or falls below a threshold value the and E-shift may be initiated. Further, this E-shift judgement may take into account electric machine operating efficiency. For instance, the winding configuration may be switched when the machine's operating efficiency drops below a threshold value.

If it is determined that an E-shift should not be performed (NO at 604), the method proceeds to 606 where the method includes maintaining the current winding configuration in the electric machine. For instance, the winding reconfiguration assembly may be maintained in its current position that corresponds to a delta configuration or a star configuration. In another example, the winding reconfiguration assembly may be maintained in its current position that corresponds to a parallel configuration or a series configuration. After 606, the method returns to 602.

Conversely, if it is determined that an E-shift should be performed (YES at 604) the method proceeds to 608 where the method includes temporarily discontinuing electric power delivery to the winding reconfiguration assembly from the inverter. For instance, the MCU may send a command to the inverter to cut electric power delivery to the electric machine by way of the winding reconfiguration assembly.

At 610, the method includes transitioning the electric machine between a first winding configuration and a second winding configuration through operation of the winding reconfiguration assembly. This winding reconfiguration transition includes at 612, supplying an electric impulse to an electromagnetic actuator to move a contactor device between a first position and a second position. As previously indicated, this electric impulse changes the polarity of the coil which induces actuator movement and contactor device movement via mechanical link. The first and second winding configurations may be star and parallel configurations or vice versa, in one example. In another examples, the first and second winding configurations may a series configuration and parallel configuration or vice versa. The combination of the series and parallel configurations may be referred to as an H-bridge arrangement.

Next at 614, the method includes judging if the contactor device is in its second position. Such a judgement may be carried out using inputs from a sensor coupled to an auxiliary contact in the winding reconfiguration assembly. For instance, the sensor in the winding reconfiguration assembly may send a signal to the controller that is indicative of the position of the assembly, as previously discussed.

If it is judged that the contactor device is not in the second position (NO at 614) the method moves to 616 where the method includes sustaining electrical disconnection between the inverter and the winding reconfiguration assembly. After 616, the method returns to 614.

On the other hand, if it is judged that the contactor device is in the second position (YES at 614) the method moves to 618. At 618, the method includes resuming electric power delivery to the winding reconfiguration assembly from the inverter. In this way, electric power delivery to the winding reconfiguration assembly may be resumed when the sensor confirms that the assembly has switched into a commanded position. Method 600 allows the winding reconfiguration assembly to quickly and confidently switch the winding configuration of the electric machine to enhance machine performance.

Figure 7:
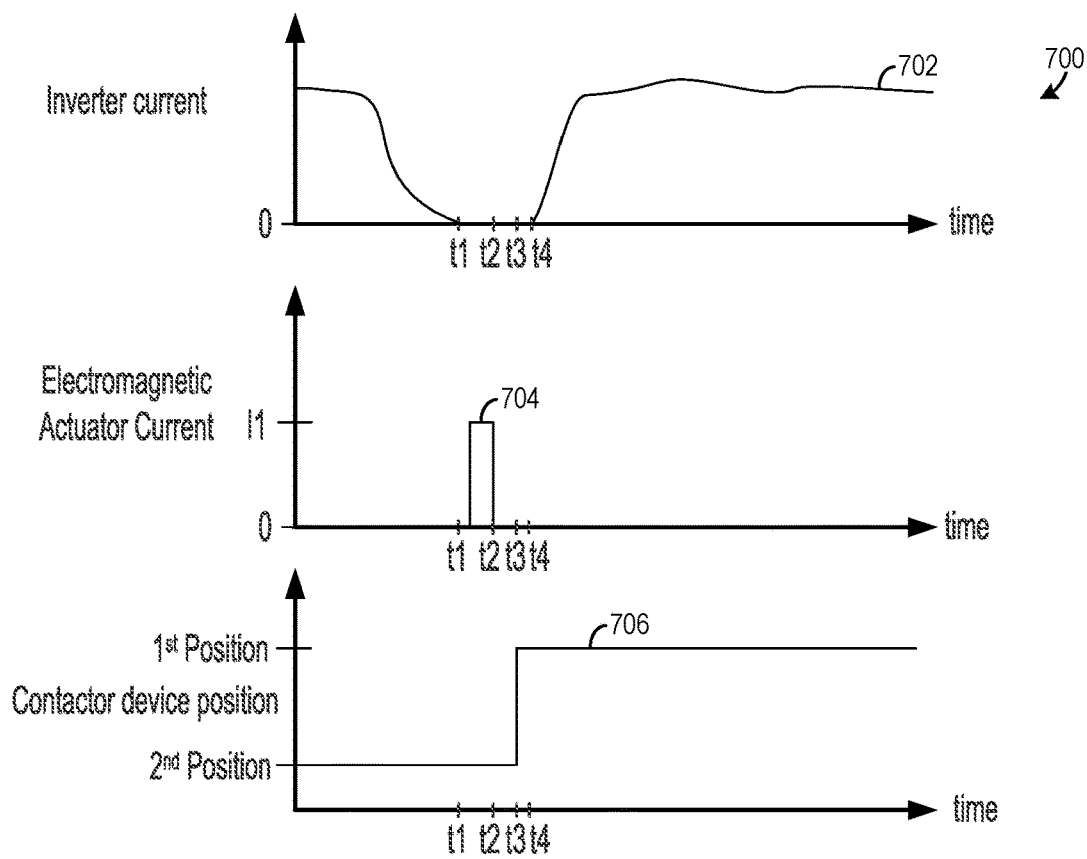
FIG. 7 shows a timing diagram associated with a control technique for a winding reconfiguration assembly.

FIG. 7 shows an example timeline 700 associated with a control scheme for a winding reconfiguration assembly in an electric motor. This control technique may be implemented in any of the previously described winding reconfiguration assemblies or combinations of the winding reconfiguration assemblies. Although specific values are not indicated in FIG. 7, the abscissas denote time which increases from left to right with points of interest t1, t2, t3, and t4 provided thereon. Further, the operating conditions indicated on the ordinates for plots 702 and 704 increase in a vertical direction. Plot 702 specifically indicates the current supplied to the winding reconfiguration assembly from the inverter, plot 704 indicates the current supplied to the electromagnetic actuator, and plot 706 indicates the position of the contactor device ($1^{st}$ position or $2^{nd}$ position).

At t1, the inverter current drop to zero. In response to the current reaching or approaching zero, a transient current is supplied to the coil in the electromagnetic actuator at t2. This transient current induces movement of the electromagnetic actuator which in turn switches the contactor device into the second position at t3. Next at t4, the delivery of electric power from the inverter the winding reconfiguration assembly is resumed. In this way, the winding reconfiguration assembly is rapidly and efficiently switched between positions which correspond to stator winding configurations. It will be understood that this switching may occur in the milliseconds time scale, in one use-case example. Further, the winding reconfiguration assembly remains in a commanded position without the use of a hold current applied to the electromagnetic actuator.

The technical effect of the methods for operation of winding reconfiguration assembly described herein is to quickly switch the stator windings of an electric machine between different configuration to increase the electric machine efficiency over a wider range of machine speed.

FIGS. 2-5B and 8-9 are drawn approximately to scale, aside from the schematically depicted components therein.

However, at least a portion of the components of the winding reconfiguration assembly may have other relative dimensions, in other examples.

FIGS. 1-5B and 8-10B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a winding reconfiguration assembly for an electric machine is provided that comprises a multi-position contactor device designed to switch stator windings in the electric machine between a first electric configuration in a first position and a second electric configuration in a second position; and an electromagnetic actuator configured switch the multi-position contactor device between the first position and the second position in response to a change in polarity of a coil in the electromagnetic actuator.

In another aspect, a method for operation of a winding reconfiguration assembly is provided that comprises: switching a multi-position contactor device in the winding reconfiguration assembly between a first position and a second position based on one or more operating conditions via toggling a polarity of a coil in an electromagnetic actuator, wherein in the first position and second position stator windings in an electric machine are in a first winding configuration and a second winding configuration, respectively; wherein the winding reconfiguration assembly includes: the multi-position contactor device; and the electromagnetic actuator. The method may further comprise, in one example, resuming current delivery from the inverter to the winding reconfiguration assembly in response a sensor indicating that multi-position contactor device reaches a target position.

In yet another aspect, a winding reconfiguration assembly for winding reconfiguration of a traction motor in an electric vehicle is provided that comprises a multi-pole and multi-position contactor device designed to switch stator windings in the electric machine between a delta configuration in a first position and a star configuration in a second position; and an electromagnetic actuator configured switch the multi-pole and multi-position contactor device between the first position and the second position via a transient application of an electric al pulse to a coil which changes the polarity of the coil which electromagnetically interact with a plurality of permanent magnets in the electromagnetic actuator.

In any of the aspect or combinations of the aspects, the multi-position contactor device may be configured to switch to a neutral position where electric energy transfer from the winding reconfiguration assembly to the electric machine is inhibited.

In any of the aspect or combinations of the aspects, the multi-position contactor device may include a plurality of multi-position contacts.

In any of the aspect or combinations of the aspects, the first electric configuration may be a star configuration.

In any of the aspect or combinations of the aspects, the first electric configuration may be a delta configuration.

In any of the aspect or combinations of the aspects, the winding reconfiguration assembly may further comprise a controller including instructions stored in non-transitory memory that when executed cause the controller to: change the polarity of the coil to switch the multi-position contactor device between the first electric configuration and the second electric configuration based on one or more operating conditions.

In any of the aspect or combinations of the aspects, the winding reconfiguration assembly may further comprise a plurality of flexible bus bars electrically coupled to the contactor device.

In any of the aspect or combinations of the aspects, the winding reconfiguration assembly may further comprise a sensor coupled to an auxiliary contact and configured to sense a position of the multi-position contactor device.

In any of the aspect or combinations of the aspects, the winding reconfiguration assembly may further comprise one or more cooling plates designed to transfer heat from the electromagnetic actuator to a housing of the electric machine.

In any of the aspect or combinations of the aspects, the stator winding may be a six-phase or a nine-phase stator winding.

In any of the aspect or combinations of the aspects, the first electric configuration may be a series configuration and the second electric configuration may be a parallel configuration.

In any of the aspect or combinations of the aspects, the one or more operating conditions may include at least one of an electric machine speed and an electric machine load.

In any of the aspect or combinations of the aspects, switching the multi-position contactor device in the winding reconfiguration assembly between a first position and a second position may occur while current to the winding reconfiguration assembly from an inverter is discontinued.

In any of the aspect or combinations of the aspects, in the first position the multi-pole and multi-position contactor device, a plurality of inlet phase bus bars may be electrically coupled to a plurality of return phase bus bars; and in the second position the multi-pole and multi-position contactor device, the plurality of inlet phase bus bars may be electrically decoupled from the plurality of return phase bus bars.

In any of the aspect or combinations of the aspects, the winding reconfiguration assembly may be directly coupled to an electric machine and wherein the electric machine may a traction motor in an electric vehicle.

In any of the aspect or combinations of the aspects, the traction motor may be a three, six, or nine phase traction motor.

In another representation, a winding switching device for a multi-phase traction motor is provided. The winding switching device includes an actuator with a coil and permanent magnets that switch position of a plurality of contactors in response to a transient current pulse applied to the coil, wherein the plurality of contactors electrically coupled a flexible return phase bus bars.

Note that the example control and estimation routines included herein can be used with various electric machine and/or vehicle configurations. The control methods and routines disclosed herein may be stored as executable instructions in non-transitory memory and may be carried out by the control system including the controller in combination with the various sensors, actuators, and other electric machine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the electric machine control system, where the described actions are carried out by executing the instructions in a system including the various electric machine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to various types of electric motors and vehicle configurations. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A winding reconfiguration assembly for a multi-phase electric machine, comprising:
   a multi-position contactor device designed to switch stator windings in the multi-phase electric machine between a first electric configuration in a first position and a second electric configuration in a second position;
   an electromagnetic actuator configured switch the multi-position contactor device between the first position and the second position in response to a change in a polarity of a coil in the electromagnetic actuator; and
   a sensor coupled to an auxiliary contact and configured to sense a position of the multi-position contactor device.

2. The winding reconfiguration assembly of claim 1, wherein the multi-position contactor device is configured to switch to a neutral position where electric energy transfer from the winding reconfiguration assembly to the multi-phase electric machine is inhibited.

3. The winding reconfiguration assembly of claim 1, wherein the multi-position contactor device includes a plurality of multi-position contactors.

4. The winding reconfiguration assembly of claim 3, further comprising a plurality of flexible return phase bus bars electrically coupled to the plurality of multi-position contactors.

5. The winding reconfiguration assembly of claim 1, wherein the first electric configuration is a star configuration.

6. The winding reconfiguration assembly of claim 1, wherein the first electric configuration is a delta configuration.

7. The winding reconfiguration assembly of claim 1, further comprising:
   a controller including instructions stored in non-transitory that when executed cause the controller to:
      change the polarity of the coil to switch the multi-position contactor device between the first electric configuration and the second electric configuration based on one or more operating conditions.

8. The winding reconfiguration assembly of claim 1, further comprising one or more cooling plates designed to transfer heat from the electromagnetic actuator to a housing of the multi-phase electric machine.

9. The winding reconfiguration assembly of claim 1, wherein the stator windings are a six-phase or a nine-phase stator windings.

10. The winding reconfiguration assembly of claim 1, wherein the first electric configuration is a series configuration and the second electric configuration is a parallel configuration.

11. The winding reconfiguration assembly of claim 1, wherein the multi-phase electric machine is a traction motor-generator.

12. A method for operation of a winding reconfiguration assembly, comprising:
   switching a multi-position contactor device in the winding reconfiguration assembly between a first position and a second position based on one or more operating conditions via toggling a polarity of a coil in an electromagnetic actuator, wherein in the first position and the second position stator windings in a multi-phase electric machine are in a first winding configuration and a second winding configuration, respectively;

wherein the winding reconfiguration assembly includes:
the multi-position contactor device; and
the electromagnetic actuator;
wherein the one or more operating conditions includes at least one of an electric machine speed and an electric machine load; and
wherein switching the multi-position contactor device in the winding reconfiguration assembly between the first position and the second position occurs while current to the winding reconfiguration assembly from an inverter is discontinued.

13. The method of claim 12, further comprising resuming current delivery from the inverter to the winding reconfiguration assembly in response a sensor indicating that the multi-position contactor device is in a commanded position, wherein the sensor is coupled to an auxiliary contact.

14. A multi-phase electric machine system comprising:
a winding reconfiguration assembly comprising:
a multi-pole and multi-position contactor device designed to switch stator windings in a multi-phase electric machine between a delta or series configuration in a first position and a star or parallel configuration in a second position; and
an electromagnetic actuator designed to switch the multi-pole and multi-position contactor device between the first position and the second position via a transient electrical pulse applied to a coil which changes a polarity of the coil which electromagnetically interacts with a plurality of permanent magnets in the electromagnetic actuator;
wherein in the first position the multi-pole and multi-position contactor device, a plurality of inlet phase bus bars are electrically coupled to a plurality of flexible return phase bus bars; and
wherein in the second position the multi-pole and multi-position contactor device, the plurality of inlet phase bus bars are electrically decoupled from the plurality of flexible return phase bus bars.

15. The multi-phase electric machine system of claim 14, wherein the winding reconfiguration assembly is directly coupled to an electric machine and wherein the electric machine is a traction motor in an electric vehicle.

16. The multi-phase electric machine system of claim 15, wherein the traction motor is a three, six, or nine phase traction motor.

* * * * *